Feb. 16, 1932.   S. EINSTEIN ET AL   1,845,865
MACHINE TOOL
Original Filed Jan. 28, 1924
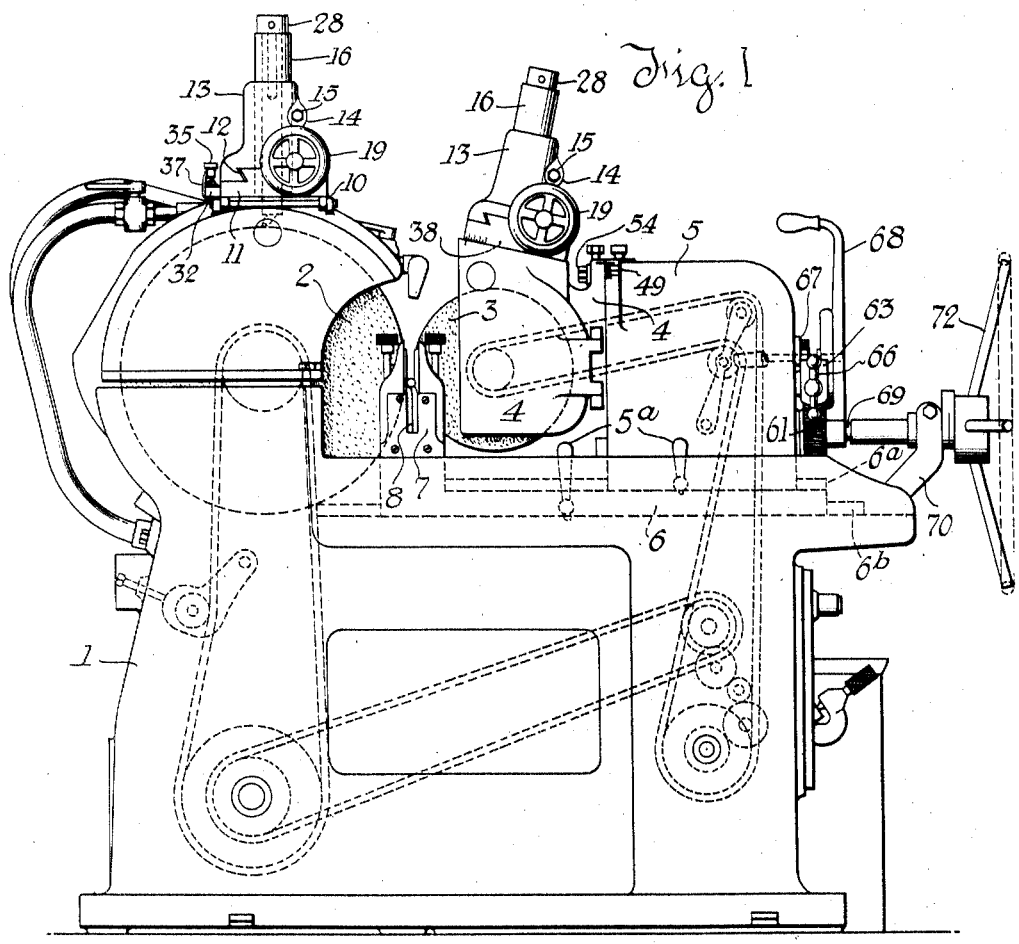
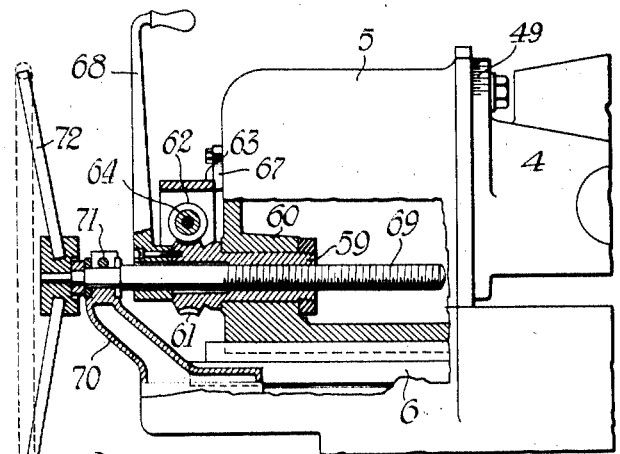
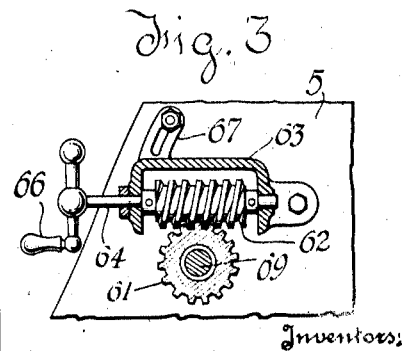
Inventors:
Sol Einstein;
Lester F. Nenninger;
Dodge & Sons
Attorneys Patented Feb. 16, 1932

1,845,865

UNITED STATES PATENT OFFICE

SOL EINSTEIN AND LESTER F. NENNINGER, OF CINCINNATI, OHIO, ASSIGNORS TO CINCINNATI GRINDERS INCORPORATED, OF CINCINNATI, OHIO, A CORPORATION OF OHIO

MACHINE TOOL

Original application filed January 28, 1924, Serial No. 689,068. Divided and this application filed February 14, 1930. Serial No. 428,468.

This invention pertains to machine tools and more particularly to centerless grinding machines. Specifically it relates to means for adjusting the grinding wheel or the control wheel of a centerless grinder, either in relation to the other, or adjusting each relatively to the other as desired. Though primarily designed for use in centerless grinding machines, it is susceptible of use in other machine tools, or wherever adjustments are to be made of two slides each independently adjustable relatively to a third element and to each other.

In the embodiment here illustrated the invention is applied to two members, one slidable on the bed or table of a grinder frame, toward and from the grinding wheel, the second member being superposed upon the first and movable with or independently of the lower member. Provision is also made for quickly locking the lower member to and releasing it from the machine bed or table, and for independently locking the upper member to or releasing it from the lower member. The lower member in the present instance carries a work-rest or support, and the upper member constitutes a carrier for the control wheel which governs the rotation of the article to be operated upon by the grinding wheel, and also carries the mount for said wheel.

The adjustments thus provided permit the proper positioning of the work-rest and the work relatively to the grinding wheel, or of the control wheel relatively to the work and the grinding wheel; the advance or recession of the governing wheel relatively to the work to permit grinding to predetermined diameter; and separation of the wheels to facilitate removal of finished articles and introduction of others to be ground.

The present application is a division of the joint application Serial No. 689,068 filed in our names on January 28, 1924, and is made pursuant to official requirement.

The accompanying drawings substantially reproduce Figs. 1, 5 and 6 of the drawings of the original application, and the parts are designated by the same numerals used therein to facilitate their reading and comparison with the specifications of either application. Referring to these drawings:

Fig. 1 is a side elevation of a complete grinding machine embodying our invention;

Fig. 2 is a fragmentary side elevation of the frame of the machine showing the slides and the governing wheel mount, portions being broken away and sectioned to show details of construction;

Fig. 3 is a detail view illustrating worm gear which serves to rotate or to lock against rotation an internally threaded sleeve of the mechanism for advancing and receding the slide 6.

In order to make clear the invention and its use, the grinding machine and its mode of adjustment and operation will first be outlined briefly in connection with Fig. 1.

As shown, the grinding machine comprises a substantial base or main frame 1, a grinding wheel 2 and a governing or control-wheel 3, said wheels being of the same or similar material and texture, and each mounted upon a spindle or arbor carried in bearings or in a single sleeve bearing. The bearing or bearings of the arbor of wheel 2 is or are advisably fixed rigidly in position, as it is important to prevent or reduce to a minimum any vibration of the machine or its parts, more likely to be produced by the large and swiftly rotating grinding wheel than by any other part of the machine. The spindle or arbor of the governing or control-wheel 3 is carried in a sleeve bearing supported by a yoke or bracket 4, secured to and supported by a shell or carrier 5 slidable upon ways and adapted to be moved thereon to cause the periphery of wheel 3 to approach more or less nearly to that of wheel 2, and thereby to gage and determine the grinding space between them. Carrier 5 is guided by ways preferably formed upon the upper face of a slide 6, in turn movable upon like guideways formed on the bed or top plate of the grinding machine.

Both the carrier 5 and the slide 6 are provided with conventionally indicated means as camming levers 5ª, for clamping them to the ways 6ª and 6ᵇ on which they respectively move, and by so clamping both they will be held against any movement; by releasing the slide 6 it and the carrier clamped to it may be moved as one; and by releasing both the carrier and the slide, either may be moved relatively to the other. In this way a work-rest 7—8 carried by the forward or inner end of the slide 6 may be correctly positioned between and relatively to the grinding and the governing wheels, and the slide may then be clamped to maintain such adjustment; the carrier 5 may next be moved to bring governing wheel 3 into proper relation to the work-rest and grinding wheel and then be clamped to the slide 6, thus securing the carrier and governing wheel at their proper adjustment; or the carrier may be freed for movement back and forth, as required.

In the use of the machine two modes of operation are interchangeably employed according to conditions, such as the amount of grinding desired, the character of the material to be ground, the presence or absence of head, shoulder, or enlargement at any point in the length of the work ground, etc.

If plain cylinders of uniform diameter, considerable length, and requiring relatively little grinding, are to be handled or produced, it is often expedient to tilt slightly the axis of the governing or control-wheel 3 relatively to the axes of the grinding wheel 2 and the work, and to the work-supporting face of the work-rest bar or blade 8, and thus to cause an automatic rotation and axial feed or advance of the work over its supporting rest. Such feed is due to the slower rotation and greater grip or hold of the governing wheel 3 as compared with that of the grinding wheel, and to the fact that the thrust of wheel 3 is not perpendicular but at an obtuse angle to, the axis of the work, and is hence divided between rotating and axially advancing the same along the work-rest.

If plain cylindrical grinding of only one diameter, or conical grinding, is to be performed, but the length of the portion to be ground is not in excess of the width of the working face of the grinding wheel, the grinding may be effected more rapidly and uniformly without axial feed. In such case the axes of the wheel and work, and the work-supporting face of the work-rest blade or bar will be placed and maintained in common radial plane, and the two wheels gradually approached until the requisite depth or amount of metal is cut away, whereupon the wheel carried in a movable support or carrier will be retracted to free the work and afford ample space to receive another unground blank or object, after which the stated cycle of operations will be repeated so long as blanks of the same form and dimensions are to be ground.

If headed or shouldered objects are to be ground, similar adjustments will be made, the wheels being dressed and a work-rest blade or bar provided to suit such object, that is, shouldered if the object to be ground is shouldered, beveled if the work to be ground is conical, and so on.

When the governing or control-wheel has its axis inclined to cause it to feed or advance the work, its circumferential face is dressed or soon wears away, to a slightly hollowed or concave form between its ends, affording a line bearing or contact with the work across the entire width of the peripheral face of the governing or control wheel, and thus ensuring uniform and certain rotation and feed of the work. The curvature under ordinary working inclination of the axis of the governing wheel is scarcely perceptible to the eye, even when a straight-edge is laid over the wheel parallel with its axis; but it should be present, and will be automatically produced in a short time, through the wearing effect of the work against which it presses, if not dressed to such form.

Figures 2 and 3 illustrate means for advancing and receding the carrier 5, yoke 4 and the governing wheel 3 carried by said yoke, with and without the slide 6. This mechanism is used both for initially adjusting the work-rest and the governing or control-wheel relatively to the grinding wheel, and for advancing the governing wheel progressively when the grinding is done without automatic axial or spiral feed of the work. Said mechanism comprises an internally threaded sleeve or nut 59 swiveled in a boss 60 of the outer wall of shell or carrier 5, and provided with a worm-wheel 61 with which meshes a worm or screw 62 journaled in a swinging support or housing 63 pivoted at one end to the rear wall of said carrier. The shaft 64 of the worm 62 is provided at one end with a hand-crank 66 by which to rotate it. The worm-housing 63 is provided with a slotted lug or ear 67, through which passes a clamping screw by which said housing may be clamped and held in an elevated position out of mesh with worm-wheel 61.

A hand-lever 68 is attached to the sleeve 59, or to the worm-wheel formed therewith, by which said sleeve may be given a partial rotation under the control of the operator or attendant, and subject to constant determination, through the sense of feeling, of the pressure at any time exerted by the governing wheel against the work. This hand-lever 68 thus affords convenient and dependable means for moving the carrier 5 and consequently the governing wheel 3, gradually and to a predetermined extent in a direction to cause progressive grinding of the work, and for receding the governing wheel when the grinding of an object is completed and it is desired to remove it and introduce another to be ground. When the hand-lever 68 is being used for this purpose, the worm 62 is lifted and locked out of mesh with the worm-wheel 61.

Passing centrally through and threaded to fit the thread within the swivel sleeve 59 is a screw-threaded stem 69, the screw stem being journaled near its outer end in a bracket or supporting arm 70 carried by the main frame of the machine, radially slitted from the bearing in which the shaft is journaled, to its top, and provided with a bolt or screw 71 passing through the two arms made by the slitting of bracket 70. The bolt 71 serves to draw together the arms of bracket 70, and thus to clamp or hold the stem 69 against rotation when it is desired to advance or recede the carrier 5 and consequently the governing wheel, by rotation of the sleeve 59. A spoked wheel or hand-wheel 72 upon the outer end of screw stem 69 serves as a means of rotating said screw when the pinch or binding screw 71 is backed off to free it. When this is done, or when the screw 69 is to be rotated for advancing and receding the carrier 5, either independently or together with the slide 6 to which it may be at any time locked, sleeve 59 is locked against turning by dropping the worm 62 into mesh with the worm-wheel 61. At such tmes the worm or screw 62 will not be turned or manipulated, but will serve, as stated, to hold the worm-wheel 61 and the sleeve 59 against rotation by the hand-lever 68, or through the friction of screw 69 turning therewith.

These provisions are made to enable the carrier 5 to be advanced or receded by the screw 69 when it is desired to traverse the carrier relatively long distances, as in initially setting the work-rest and later the governing wheel, relatively to the grinding wheel. After such adjustments are effected the screw 69 is or may be clamped against rotation, and the slide 6 clamped or locked against longitudinal movement, whereupon the carrier may be moved considerable distances by rotation of the worm 62. When all adjustments are made for progressive grinding without automatic axial feed, the hand-lever 68 will be employed to rotate sleeve 59, the worm 62 being first lifted and locked out of mesh with the worm-wheel 61, the swing of the lever 68 in each direction being limited and determined by any suitable stops placed in its path. To permit traverse of the carrier 5 through the action of worm 62, a distance materially greater than that effected by backward and forward movement of lever 68, said lever may be disconnected from the sleeve 59 or its worm-wheel 61 during the rotation of worm 62, so that such traverse through use of worm 62 shall not be restricted by engagement of lever 68 with either of its limiting stops. After adjustment through rotation of worm-wheel 61 is completed, lever 68 will be again made fast to the worm-wheel 61 or sleeve 59, so that the sleeve may be again oscillated by said lever.

Parts illustrated in the drawings but not specifically described herein are described in detail, and are reserved for and claimed in the parent application, Serial No. 689,068.

The term "machine tool" is here used with the meaning ascribed thereto in such works as the Century Dictionary, Knight's Mechanical Dictionary, and the Standard Dictionary. The latter defines the term as meaning: "A machine carrying a tool, as a cutter or die or other shaping implement, or one of which the tool is a part, for performing any of various cutting or shaping processes in metal or wood working: opposed to hand tool." The term "machine tool" accordingly comprehends any machine tool for working in metal, wood and other materials, for planing, slotting, shaping drilling, punching, shearing, sawing, boring, reaming, turning, or otherwise shaping or preparing materials for use.

We claim:—

1. In a grinding machine, the combination of a main frame or support; a grinding wheel, a co-acting governing or control wheel, and an intermediate work-rest, said wheels being peripherally opposed; a carrier for the governing wheel; and means for advancing and receding said carrier relatively to the grinding wheel, comprising an internally threaded sleeve swiveled in the carrier and provided with a worm-wheel, a screw threaded to fit the threads of said sleeve, passing through the same and swiveled at its outer end in a supporting bracket, a hand-wheel carried by the stem of said screw and serving to rotate the same when the screw is free, means for clamping said screw against rotation, a worm journaled in a swinging support or housing and thereby adapted to be placed in or out of mesh with the worm-wheel of the sleeve, said worm serving when turned to rotate the sleeve and when at rest to hold said sleeve against rotation, a crank-arm or handle for rotating said worm, and means for holding the worm out of mesh or engagement with the worm-wheel.

2. In a grinding machine, the combination of a main frame or support; a grinding wheel, a co-acting governing or control wheel, and an intermediate work-rest, said wheels being peripherally opposed; a carrier for the governing wheel; and means for advancing and receding said carrier relatively to the grinding wheel, comprising an internally threaded sleeve swiveled in the carrier and provided with a worm-wheel, a screw threaded to fit the threads of said sleeve, passing through the same and swiveled at its outer end in a supporting bracket, a hand-wheel carried by the stem of said screw and serving to rotate the same when the screw is free, means for clamping said screw against rotation, a worm journaled in a swinging support or housing and thereby adapted to be placed in or out of mesh with the worm-wheel of the sleeve, said worm serving when turned to rotate the sleeve and when at rest to hold said sleeve against rotating, a crank-arm or handle for rotating said worm, means for holding the worm out of mesh or engagement with the worm-wheel, and a hand lever carried by and serving to impart oscillatory movement to the sleeve when said sleeve is not locked by the worm.

3. In a machine tool, the combination of a machine frame having a bed or table; a shaping tool carried in said frame; a slide movable in guides on the bed or table of said frame toward and from the shaping tool, and provided with a work support; a carrier mounted upon said slide and movable along guideways thereon; an implement supported by and movable with said carrier; and means for advancing and receding said carrier jointly with and independently of the slide upon which it is guided, said means comprising a threaded shaft mounted and rotatable in a support carried by the machine frame, means for holding said shaft against rotation and for freeing the same to permit rotation thereof, a hand-lever for rotating said shaft when free, a sleeve encompassing said shaft and internally threaded to correspond with the threading of the shaft, a worm-wheel carried by said sleeve and concentric therewith, a worm threaded to mesh with said worm-wheel, a housing in which said worm is journaled and movable toward and from the worm-wheel to effect and to prevent intermeshing with said worm-wheel, means for holding said housing in position to maintain disengagement of the worm-wheel, and a hand-lever swiveled upon the threaded shaft and provided with means for connecting it with and disconnecting it from the sleeve; said combination permitting the threaded shaft to be held at rest and the sleeve to be rotated continuously by rotation of the worm, or oscillated by means of the hand lever, and permitting said sleeve and actuating member to be held against actuation and the carrier or carrier and slide to be advanced or receded through rotation of the threaded shaft.

4. A machine tool comprising a main frame; a shaping element mounted thereon and normally fixed in position; a slide provided with a work-holder or support and movable upon said frame toward and from the shaping element; a carrier mounted and movable on said slide and provided with a member to co-act with the shaping member; means for readily securing the slide in fixed relation to the machine frame and releasing it therefrom; means for securing the carrier to and releasing it from the slide; and mechanism for advancing and receding the carrier with and independently of the slide, said mechanism comprising a threaded shaft journaled in a support carried by the main frame, means for clamping said shaft to prevent, or releasing it to permit, rotation of said shaft, an internally threaded sleeve encompassing said shaft and rotatable in a bearing in the carrier, a worm-wheel threaded to correspond to the threading of the worm, a housing in which said worm is journaled, movable to engage and disengage the worm with and from the worm-wheel, means for manually rotating the threaded shaft, means for manually rotating the worm, and a hand-lever provided with means for readily connecting it with and disconnecting it from the sleeve or its worm-wheel.

5. A machine tool comprising a frame provided with a bed or table; a tool mounted on said frame; a slide movable on a guideway on said bed or table and provided with a work support; a carrier mounted upon said slide, movable on a guideway thereon and carrying an element to co-act with the tool upon work placed on said work support; independent means for locking the slide to and releasing it from the bed or table, and for locking the carrier to and releasing it from the slide; and mechanism for moving the carrier with and independently of the slide toward and from the tool, said mechanism consisting of a threaded shaft and an encompassing threaded sleeve, and means for at will locking either the threaded shaft or the sleeve against rotation while the unlocked one of said parts is left free to be rotated to advance or recede the carrier, or the carrier and slide, as desired.

6. In a machine tool, a main frame; a tool carried thereby; a slide movable on the frame and provided with a work support; a carrier movable on and relatively to the slide and provided with an element to act upon work placed on said support; an internally threaded sleeve rotatable in said carrier; a rotatable shaft passing through said sleeve and threaded to mesh with the threads of the shaft; means for locking either the sleeve or the shaft against rotation while the other of said elements is left free to be rotated; and mechanism for rotating the free member.

7. As a means for optionally imparting movement to either of two slidable elements of a machine tool, or to the two together, a rotatable internally threaded sleeve carried by one of said members; a correspondingly threaded shaft concentric with and passing through said sleeve and carried by the frame of the machine tool; means for individually and at will clamping either the sleeve or the shaft against rotation while leaving the other free to be rotated; means for locking one of the slidable elements to the machine frame and releasing it therefrom at will; means for locking the two slidable elements together and for unlocking them; and means for rotating the free member.

8. A machine tool organization including a main frame, a tool and a work supporting member mounted on the frame for translation one with respect to the other and means for effecting said movement including a threaded shaft and an encompassing threaded sleeve, means for securing one of said two last named parts to the main frame for rotation while restraining it against axial movement with respect thereto, means for similarly securing the other of said parts to the translatable member, means for rotating the shaft for general adjustment of the translatable member and a worm and worm gear mechanism associated with the sleeve for rotation thereof to effect an accurately controlled supplemental adjustment of the parts.

9. In a grinding machine the combination with a main frame, or support, a grinding wheel carried thereby, a coacting governing wheel, a carrier for the governing wheel and means for advancing and retracting said carrier relative to the grinding wheel including an internally threaded sleeve and a screw in threaded engagement with the sleeve, one of said parts being swiveled to the frame or support and the other to the carrier and means for individually rotating said sleeve and said screw for effecting movement of the carrier, one of said means including a worm and worm gear whereby minute degrees of rotation may be imparted to the associated element and consequent fine and accurate adjustment of the carrier accomplished.

10. A grinding machine of the character described, including a bed or support, a wheel carriage slidably mounted thereon; and means for controlling the position of said wheel carriage, said means including interengaged screw and nut members, one of said members being coupled to said wheel carriage and held against axial movement relative thereto and the other of said members being coupled to the support and held against axial movement relative to the support, and means for rotating one of said members for imparting oscillations of predetermined amplitude to the wheel carriage, and additional means for rotating the other of said members to change the zone of movement of the carriage oscillation of a given amplitude.

11. In a machine tool, in combination, a main bed or frame; a work-support carried thereby; a tool carriage mounted upon the main bed and provided with a tool to operate upon work carried by said work-support; and mechanism for adjusting said carriage toward and from the work-support, comprising an internally threaded sleeve rotatably mounted in said carriage, a screw passing axially through and in threaded engagement with said sleeve, means for holding the screw against rotary movement while permitting the rotary movement of the sleeve and for holding the sleeve against rotation while permitting rotary movement of the screw, means for at will oscillating one of said members, the sleeve or the screw, a limited distance while holding the other of said members against rotary movement, and means for rotating one of said members continuously while making longer adjustments of the carriage.

In witness whereof, we have hereunto subscribed our names.

SOL EINSTEIN.
LESTER F. NENNINGER.